Sept. 2, 1930.  K. DOMBECK  1,774,594
LAWN MOWER
Filed April 21, 1927   2 Sheets-Sheet 1
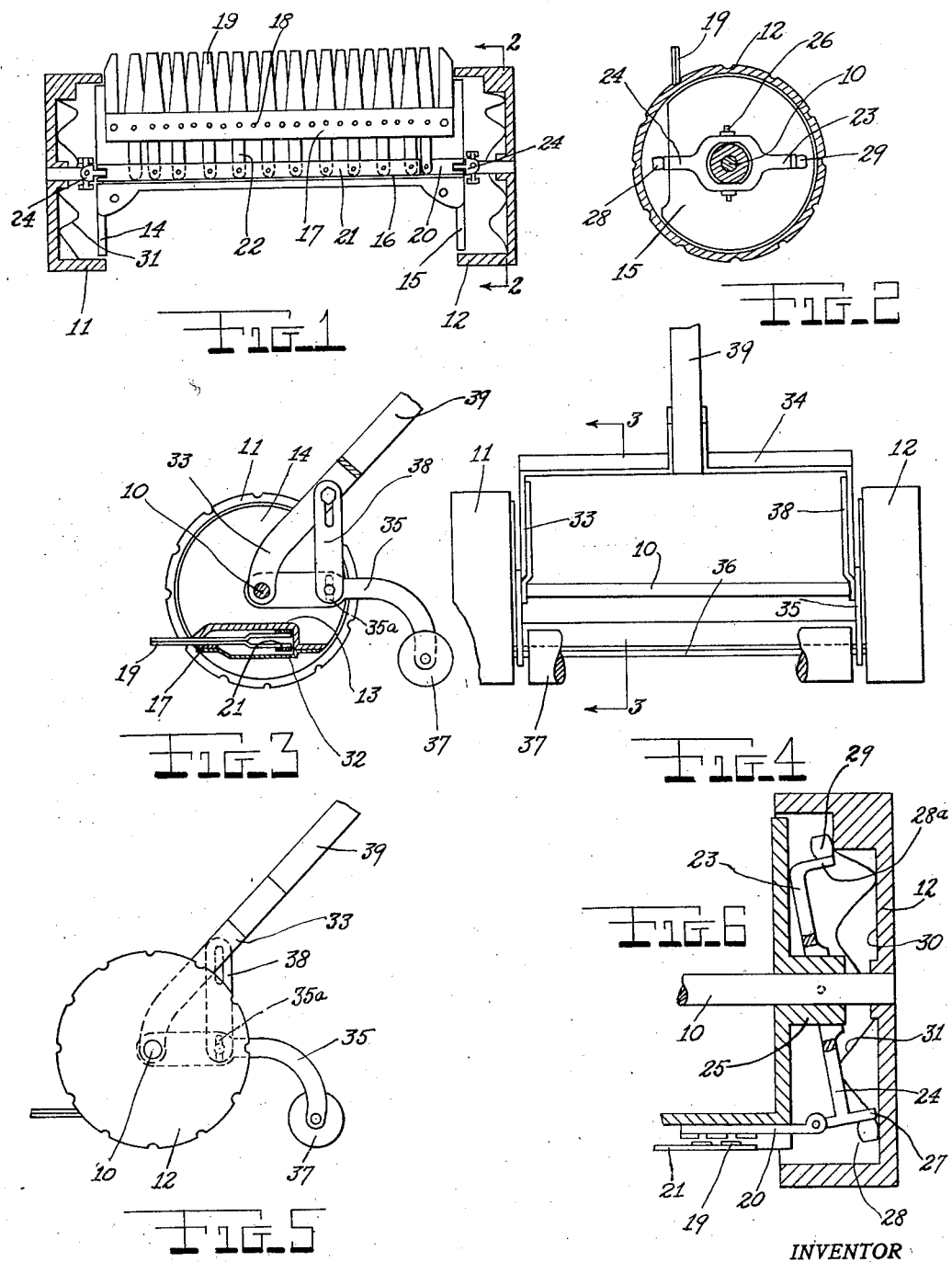
INVENTOR
K. Dombeck
BY F. Ledermann
ATTORNEY Sept. 2, 1930.  K. DOMBECK  1,774,594
LAWN MOWER
Filed April 21, 1927  2 Sheets-Sheet 2
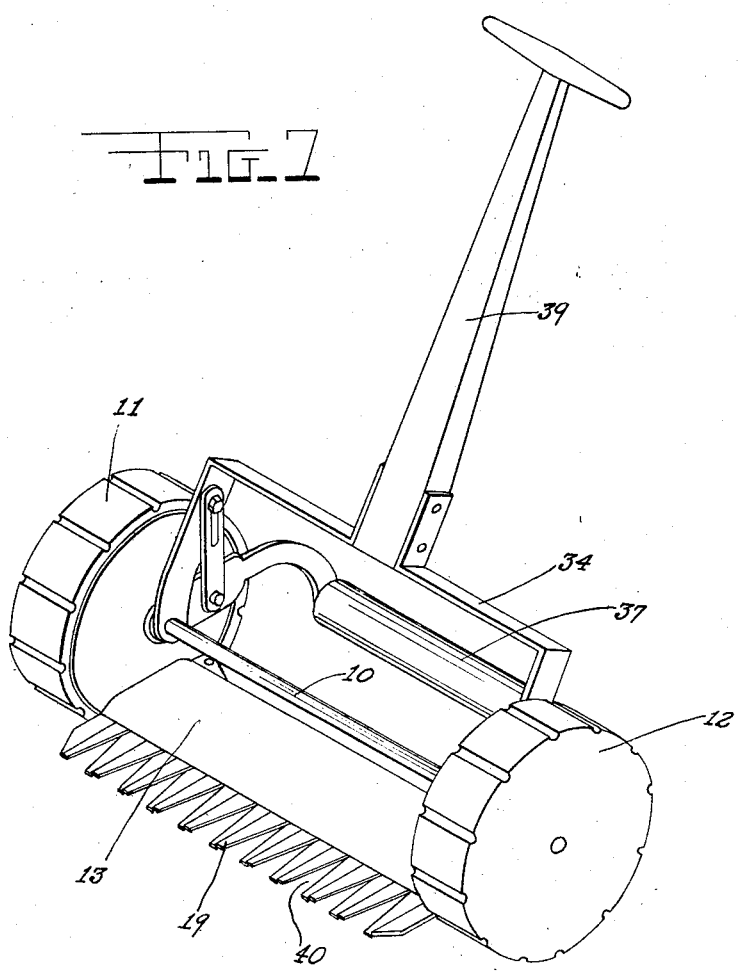
INVENTOR
*K.Dombeck*
BY
ATTORNEY Patented Sept. 2, 1930

1,774,594

UNITED STATES PATENT OFFICE

KAZIMER DOMBECK, OF MILLER FIELD, STATEN ISLAND, NEW YORK

LAWN MOWER

Application filed April 21, 1927. Serial No. 185,639.

The main object of this invention is to provide a lawn mower which has a plurality of blades having a scissors movement. The blades are pivoted and are actuated by reciprocating bars, the latter being given their movement by radial cams which are located in the traction wheels of the lawn mower.

Another object of this invention is to provide a lawn mower having sets of scissors blades which cooperate with the adjacent blades in a novel manner, the blades being given a shearing movement by levers which are actuated by the traction wheels of the lawn mower as it is being wheeled over the ground.

The above and other objects will become apparent in the description below in which characters of reference refer to like-named parts in the drawing.

Referring briefly to the drawing, Figure 1 is a sectional bottom plan view of the lawn mower with the cover removed to show the blade operating mechanism.

Figure 2 is a sectional end elevational view taken on line 2—2 of Figure 1.

Figure 3 is a cross sectional view taken on line 3—3 of Figure 4.

Figure 4 is a front elevational view of the lawn mower, parts being broken away.

Figure 5 is an end elevational view of the lawn mower.

Figure 6 is an enlarged sectional elevational view of one of the traction wheels showing the mechanism which actuates the scissors blades.

Figure 7 is a perspective view of the lawn mower showing its external appearance.

Referring in detail to the drawing, the numeral 10 indicates an axle on which the entire lawn mower is mounted. The ends of the axle are provided with traction wheels 11 and 12 secured thereon, the wheels being firmly secured to the axle so that all three rotate in unison. The wheels are of hollow construction having a blank face and a rim, the open portion of the wheels being positioned inwardly. A body having a channeled frame 13 is suspended from the axle. The ends of the frame, which is longitudinal, have disks 14 and 15 integral therewith which are provided with openings thru which the axle passes. A plate 17 extends across the channeled frame and is anchored to the latter at its ends. This plate has a plurality of pins 18 secured therein, each one of which serve as a pivot for a pair of scissors blades 19, which in their movement are adapted to alternately spread apart from each other and then mutually overlap. To the rear of the plate 17 a channel 16 is formed in the frame of the lawn mower and extends transversely across the machine. The blades 19 are arranged in two rows, one above the other and extend from both sides of the pivot, the forward projecting ends being the shearing ends and the opposite ends extend rearwardly and being secured to the actuating members which consist of a pair of bars 20 and 21 which are mounted slidably in the channel 16. These actuator bars are positioned one above the other in the channel the bar 20, which is the upper one, has all the rear ends 22 of the upper row of blades 19 secured thereto while the lower blades are secured to the actuator bar 21.

The hollow portion within the wheels 11 and 12 adjacent the disks of the frame houses a lever which is provided with two ends 23 and 24 and intermediate its length has an opening which is slipped over the hub 25, which latter is formed on the face of the disk and is integral therewith. Intermediate the length of the lever set screws 26 pass thru the same and screw into the wall of the hub and trunnion the lever so that the ends swing to and fro within the wheels. The end 24 of the lever in one of the wheels is pivotally attached to the actuator bar 21 as shown in Figure 6, while the remaining actuator bar 20 is attached in a similar manner to the end 24 of the lever located in the opposite wheel 11. The end 24 of the levers has an arm 27 which is bent sidewise and has a roller 28 with a curved periphery, rotatably mounted thereon. The opposite end 23 of the lever also has a sidewise bent arm 28ª on which a roller, similar to the roller 28 is mounted, said roller being indicated by the numeral 29.

The face 30 of the wheels 11 and 12 which is located within the hollow chamber has a plurality of successive radial cam ridges 31 formed thereon. These cam ridges are of odd number in each wheel so that at a position diametrically opposite to the apex of a ridge, the intersection of two adjacent ridges are formed.

The lower portion of the frame of the lawn mower is normally covered by a casing 32 which is secured in place by bolts or similar other means.

The axle 10 of the lawn mower has the curved arms 33 of a yoke 34 secured thereto. Between the arms 33 and the disks 14 and 15, lying in contact with the latter, straps 35 extend outwardly or rearwardly. These straps are curved downwardly at their opposite ends and to these curved ends a shaft 36 is secured on which a cylindrical roller 37 is permanently mounted. The straps 35 are mounted in such a way on the axle as to swing thereon, and links 38 which are slotted at one end, engage the straps by means of bolts and adjustably secure the straps in position in order to retain a handle bar 39, extending from the yoke at any inclined position.

The mechanism consists of an upper and a lower row of blades which are indicated by the numeral 19 and are tapered longitudinally toward their front ends so that a V-shaped gap exists between the pairs of closed or overlapping closed blades as illustrated in Figure 7. These blades are pivoted intermediate their length by pins 18 which are mounted on the support plate 17, one blade being mounted on each pin, which latter are positioned an equal distance apart from each other. The cam ridges 31 actuate the knife blades thru the medium of the actuator bars 20 and 21. The actuator bars are reciprocated in the channel 16 by the levers located within the hollow portion of the traction wheel, to which they are pivotally coupled. The levers in the wheels behind the disks 14 and 15 each have two free ends 23 and 24, which ends each have a roller rotatably mounted thereon. The end 24 of the lever in the wheel 11 is pivotally attached to the actuator bar 21 while the lever in the wheel 12 has its end 24 pivotally attached to the actuator bar 20 as shown in Figure 1. It is to be noted that, as the wheels are being rolled over the ground, the apex of one of the cam ridges 31 rotates to a position opposite to the free end 23 of the lever, the actuator bar which is attached to the lower end 24 of the lever is extended as at the same instant the roller attached to the end 24 of the lever reaches the depth between the two adjacent ridges. It is to be noted that the gaps between the closed blades alternate their positions, that is, the space closed by the overlapping blades at one portion of the stroke will upon further movement of the actuator bars compose a V-shaped gap and that which was the gap at that instant is closed by the overlapping blades. In the manner described alternate teeth cooperate with each other.

It is to be noted that certain changes in form and construction may be made without departing from the spirit and scope of the invention.

To provide for the adjustability of the blades 19 so that they are either in a horizontal plane or at an angle of declination toward the ground with their extreme ends, the members 35 are provided with vertical slots 35ª intermediate their length so that the angle which this member 35 assumes toward the blade carrying frame may be varied, and as these members 35 form a support which prevents the frame from tilting, adjustment of the same within the limits of the slots 35ª changes the angle of the blades as they engage the grass.

I claim:

1. In a lawn mower, a pair of hollow traction wheels, an axle rigid with said wheels, a frame positioned between said wheels and mounted stationary on said axle, a plate mounted beneath said frame, pins projecting from said plate, a tapering blade pivoted on each of said pins, said blades having cutting edges on the converging sides, said blades being arranged in two rows, the intermediate blade being complemental to its adjacent blades, bars reciprocal in said frame pivotally attached to said blades, a lever fulcrumed on said axle actuating said bars, said levers being adapted to be rocked, and projecting means on the face of said traction wheels for rocking said levers.

2. In a lawn mower, a pair of hollow traction wheels, an axle rigid with said wheels, a frame suspended from said axle, a handle bar on said frame, a plate extending across said frame having pins projecting therefrom, a tapering blade pivoted on each pin extending forwardly from the frame, bars reciprocal in said frame pivotally secured to the blades, triangular cam ridges of odd number formed in said wheels, and a rocking lever pivoted intermediate its length extending diametrically on said axle, one end of said lever riding on the apex of one cam ridge while the opposite end lies between adjacent cams rollers on the ends of said lever, the roller on one end of the lever being adapted to ride on the apex of the cam ridges while the roller at the opposite end rides between adjacent ridges.

In testimony whereof I affix my signature.

KAZIMER DOMBECK.